UNITED STATES PATENT OFFICE.

JAMES WALKER, OF BURGETTSTOWN, PENNSYLVANIA.

IMPROVEMENT IN PRESERVING APPLES.

Specification forming part of Letters Patent No. 193,788, dated July 31, 1877; application filed June 26, 1877.

*To all whom it may concern:*

Be it known that I, JAMES WALKER, of Burgettstown, in the county of Washington, and in the State of Pennsylvania, have invented certain new and useful Improvements in Process for Preserving Apples; and do hereby declare that the following is a full, clear, and exact description thereof.

The nature of my invention consists in a mode of preserving apples, the peculiarities of which will be hereinafter fully set forth.

To enable others to practice this mode, I will now proceed to describe it.

The apples, when ready to be gathered, are carefully picked from the trees and placed in slatted boxes, so that the air can circulate freely around them.

When the weather becomes sufficiently cool to pack them away, I proceed as follows: I take one barrel of coal-ashes, and to it I add two pounds of pulverized alum, and one pound of sulphur. These ingredients are thoroughly mixed. I then take a box which has a perforated bottom and lid, and place upon the bottom of the box the above mixture to the depth of about one inch, then place upon the mixture about ten inches in depth of apples, then scatter the mixture or compound over the apples until it fills up the spaces between them and then covers them about one inch. After this I continue to put in apples and compound in the same manner until the box is filled. The top is placed upon the box and it is put away in a suitable place for keeping.

By this process I am enabled to preserve apples for a year or more with their color, soundness, crispness, and flavor.

Having thus fully described my invention, what I claim as new, and desire to secure by Letters Patent, is—

The mode herein described of preserving apples, which consists in placing the apples in a ventilated box and surrounding them with a compound of coal-ashes, pulverized alum, and sulphur, substantially in the proportions and in the manner set forth.

In testimony that I claim the foregoing I have hereunto set my hand this 14th day of June, 1877.

JAMES WALKER.

Witnesses:
HENRY GANTZ,
CHARLES M. RUPLE.